Patented Apr. 2, 1929.

1,707,863

UNITED STATES PATENT OFFICE.

WALTER KROPP, OF ELBERFELD, GERMANY, ASSIGNOR TO WINTHROP CHEMICAL COMPANY, INC., OF NEW YORK, N. Y.

SOLUTION OF HYPNOTICA AND SEDATIVA AND SOLVENTS THEREFOR.

No Drawing. Application filed July 6, 1925, Serial No. 41,881, and in Germany September 1, 1924.

I have found that solutions of remedies which are difficultly soluble in water can be prepared by treating these products, e. g. phenylethylbarbituric acid, diethylbarbituric acid, diallylbarbituric acid, 3-methyl-5-isopropyl-2.3 cyclohexane, benzylic alcohol etc. with mixtures of water soluble amides of the lower members of the fatty acid series together with water soluble urethanes with or without water. These thin liquid highly concentrated solutions which can be sterilized are very valuable solutions for subcutaneous injections.

In order to illustrate my new process more fully, the following examples are given, the parts being by weight.

I. Mix together:
35 parts of ethylurethane,
35 parts of acetamide,
10 parts of phenylethylbarbituric acid, fill up this mixture to 100 parts by adding water.

II. Mix together:
35 parts of ethylurethane,
35 parts of acetamide,
15 parts of allylcrotylbarbituric acid, fill up with water to 100 parts.

III. Mix together:
35 parts of ethylurethane,
35 parts of acetamide,
10 parts of diallylbarbituric acid, fill up with water to 100 parts.

IV. Mix together:
35 parts of ethylurethane,
35 parts of acetamide,
20 parts of ethylphenylbarbituric acid, fill up with water to 100 parts.

V. Mix together:—
35 parts of formamid,
35 parts of ethylurethane,
10 parts of 3-methyl-5-isopropyl-$\Delta$2.3-cyclohexenone,
20 parts of water.

VI. Mix together:—
36 parts of formamide,
36 parts of ethylurethane,
10 parts of diallylbarbituric acid.

I claim:—

1. As a solvent a liquid mixture comprising a water-soluble amide of one of the lower members of the fatty acid series and a water-soluble urethane.

2. As a solvent a liquid mixture comprising a water-soluble amide of one of the lower members of the fatty acid series, a water-soluble urethane, and water.

3. As a new product a homogeneous liquid mixture comprising a difficultly soluble organic medicinal agent, a water-soluble amide of one of the lower members of the fatty acid series, and a water-soluble urethane.

4. As a new product a homogeneous liquid mixture comprising a difficultly soluble organic medicinal agent, a water-soluble amide of one of the lower members of the fatty acid series, a water-soluble urethane, and water.

5. As a new product a homogeneous liquid mixture comprising a synthetic organic hypnotic compound which is difficultly soluble in water, a water-soluble amide of one of the lower members of the fatty acid series and a water-soluble urethane.

6. As a new product a homogeneous liquid mixture comprising a synthetic organic hypnotic compound which is difficultly soluble in water, a water-soluble amide of one of the lower members of the fatty acid series, a water-soluble urethane, and water.

7. As a new product a homogeneous mixture comprising a barbituric acid hypnotic compound difficultly soluble in water, acetamide, ethylurethane, and water.

8. As a new product a homogeneous mixture comprising allylcrotylbarbituric acid, acetamide, ethylurethane and water.

In testimony whereof I have hereunto set my hand.

WALTER KROPP.